April 21, 1925.  1,534,437

H. L. WRIGHT

SUPPORT FOR TENNIS AND LIKE NETS

Filed Jan. 27, 1925

Inventor
Herbert Lee Wright
By
B. Singer, Atty.

Patented Apr. 21, 1925.

1,534,437

UNITED STATES PATENT OFFICE.

HERBERT LEE WRIGHT, OF BIRMINGHAM, ENGLAND.

SUPPORT FOR TENNIS AND LIKE NETS.

Application filed January 27, 1925. Serial No. 5,161.

*To all whom it may concern:*

Be it known that I, HERBERT LEE WRIGHT, A. M. I. C. E., a subject of the King of Great Britain, residing at Ramandroog, Spies Lane, Quinton, Birmingham, in the county of Warwick, England, have invented new Improvements in Supports for Tennis and like Nets; and I do hereby declare the following to be a full, clear, and exact description of the same.

This invention relates to a new and improved support for tennis nets and has for its primary object the production of a generally improved support which will combine the greatest number of advantageous features in general use with an extreme economy of parts and simplicity of manufacture.

A particular object of the invention is to provide a support in which the net cord can be wound upon a supporting post in order to draw the net taut, and at the same time to ensure that the winding up of the cord will not alter its height on the post from the ground.

A further object of the invention is to provide an improved and simplified method of rotating the post and of accommodating the rotating instrument when not in use.

A still further object is the provision of an improved and simplified base that when fixed in position will be neat in appearance and will rigidly hold the post without the aid of additional supports or arms above ground, which are unsightly and prevent the access of a lawn mower to the grass immediately around the post. Other objects attained by this invention, and advantages accruing therefrom, will be apparent from the following description of a particular embodiment illustrated in the accompanying drawings, in which:—

Figure 1:
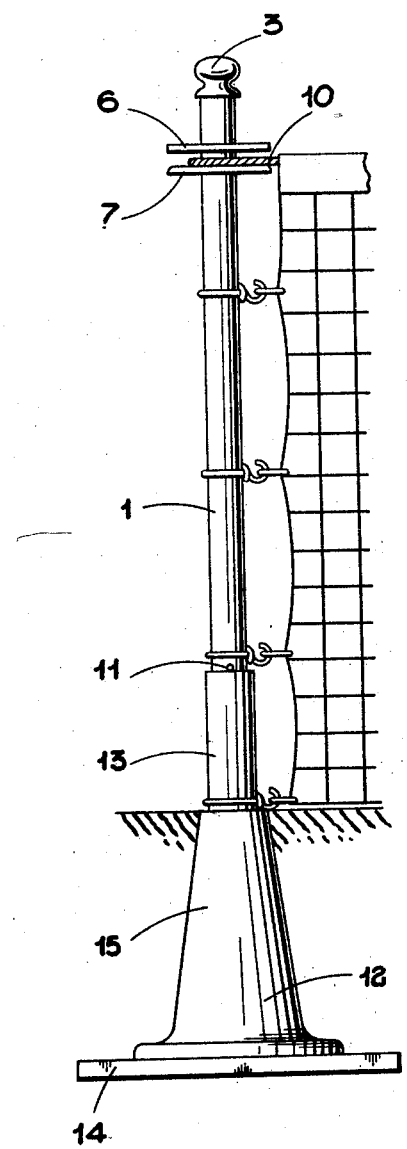
Figure 1 is a view in side elevation showing one form of my invention.
Figure 2:
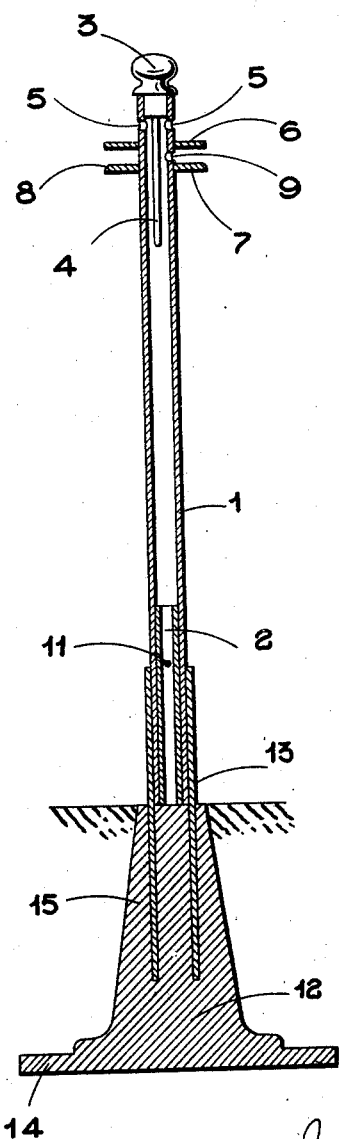
Figure 2 is a sectional view.

In the construction illustrated, the post consists of a length of tube 1, the lower end of which may be stiffened or strengthened by a liner 2, the upper end of the tube being normally closed by a knob 3 having a shank 4 which is adapted to act when required as a tommy bar. When it is desired to turn the post 1, the shank 4 is placed through the holes 5 and used as a lever.

The upper part of the tube 1 is provided with a pair of spaced flanges 6 and 7, the periphery of the lower flange 7 being rounded, as shown at 8. The tube 1 is provided with one or more holes 9 intermediate the flanges 6 and 7 for receiving the connecting pin of the net cord 10.

The lower part of the post 1 is provided with a transverse pin 11 which may be used to limit the inward or downward movement of the post in its socket or support.

In the construction illustrated, the support comprises a base 12 which may be formed as a casting and a projecting tubular socket 13 which may be cast in the base 12.

It will be seen that the upper part of the socket 13 projects considerably above the top of the base 12, so that the lower part of the post 1 is supported above the level of the ground.

Further, it will be seen that when in use it is intended that the whole of the base 12 shall be sunk below the ground level and that the usual holding down appliances are dispensed with, giving perfect access for a mowing machine around the post.

In operation, the net is wound up by simply turning the tube 1, the net cord being retained at the proper level by the flanges 6 and 7. As the net is wound the tension on the net cord increases and when the proper position is reached the tension is sufficient to cause the tube 1 to bind in the socket 13. Although not perceptible to the eye the tube 1 actually tilts within the limits allowed by its fit with the socket 13 and it is found that in practice it is quite impossible to lower or slacken the net by applying any force to the net or net cord.

The base 12 has its lower extremity formed with a wide flange 14, from the centre of which the main portion 15 of conical shape extends upwardly. In sinking this base the earth which has been removed is replaced and forced downwardly, the inclined sides of the portion 15 forcing such earth outwardly on to the flange 14, so that the whole base is very firmly anchored in the earth.

It will be understood that instead of casting in a tube, such as 13, the base 12 may be provided with a projecting spigot or tube which may be cast in the base and which may engage inside the lower part of the post 1, or a liner such as 2, instead of engaging its exterior.

What I claim then is:—

1. A support for tennis nets comprising a base fixedly mounted with respect to the ground, a post mounted on said base so as to rotate therein, means for rotating the post, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction between the post and its mounting in the base to prevent undesired rotation.

2. A support for tennis nets comprising a base fixedly mounted with respect to the ground, a post mounted on said base so as to rotate therein, said post being formed by a metal tube, means for rotating the post, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction between the post and its mounting in the base to prevent undesired rotation.

3. A support for tennis nets comprising a base fixedly mounted with respect to the ground, a post mounted on said base so as to rotate therein, said post being formed by a metal tube, a reinforcing liner within the supported end of said tube, means for rotating the post, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction between the post and its mounting in the base to prevent undesired rotation.

4. A support for tennis nets comprising a base fixedly mounted with respect to the ground, a post mounted on said base so as to rotate therein, a removable knob at the upper end of the post, a removable turning instrument within the upper end of the post, means for removably connecting the turning instrument to the post when it is in a position in which it projects laterally therefrom, and means for securing the end of a cord to the post whereby rotation of the post will wind the cord thereon and draw it taut, the lateral pull by the cord when taut causing sufficient friction between the post and its mounting in the base to prevent undesired rotation.

5. A support for tennis nets comprising a base fixedly mounted with respect to the ground, a post mounted on said base so as to rotate therein, a removable knob at the upper end of the post, a removable turning instrument within the upper end of the post, said knob being connected to the turning instrument and forming a handle thereon, means for removably connecting the turning instrument to the post when it is in a position in which it projects laterally therefrom, and means for securing the end of a cord to the post whereby rotation of the post will wind the cord thereon and draw it taut, the lateral pull by the cord when taut causing sufficient friction between the post and its mounting in the base to prevent undesired rotation.

6. A support for tennis nets comprising a base fixedly mounted with respect to the ground, a post mounted on said base so as to rotate therein, a removable knob at the upper end of the post, a removable turning instrument within the upper end of the post, means for removably connecting the turning instrument to the post when it is in a position in which it projects laterally therefrom, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction between the post and its mounting in the base to prevent undesired rotation.

7. A support for tennis nets comprising a base fixedly mounted with respect to the ground, a post mounted on said base so as to rotate therein, a removable knob at the upper end of the post, a removable turning instrument within the upper end of the post, said knob being connected to the turning instrument and forming a handle thereon, means for removably connecting the turning instrument to the post when it is in a position in which it projects laterally therefrom, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction between the post and its mounting in the base to prevent undesired rotation.

8. A support for tennis nets comprising a base fixedly mounted with respect to the ground, a post mounted on said base so as to rotate therein, said post being formed by a metal tube, a removable knob at the upper end of the post, a tommy bar within the upper end of the post, said knob being connected to the tommy bar and forming a handle thereon, at least one hole in the side of the post for receiving the end of the tommy bar when withdrawn from the post, and means for securing the end of a cord to the post whereby rotation of the post will wind the cord thereon and draw it taut, the lateral pull by the cord when taut causing sufficient friction between the post and its mounting in the base to prevent undesired rotation.

9. A support for tennis nets comprising a base fixedly mounted with respect to the ground, a post mounted on said base so as to rotate therein, said post being formed by a metal tube, a removable knob at the upper end of the post, a tommy bar within the upper end of the post, said knob being connected to the tommy bar and forming a handle thereon, at least one hole in the side of the post for receiving the end of the tommy bar when withdrawn from the post, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction between the post and its mounting in the base to prevent undesired rotation.

10. A support for tennis nets comprising a cast metal base adapted to be buried in the ground, said base having sides which diverge towards the bottom and are flanged at the bottom, a metal tube partly cast in said base and partly projecting upwardly therefrom, a post mounted to rotate freely in the said metal tube, means for rotating the post, and means for securing the end of a cord to the post whereby rotation of the post will wind the cord thereon and draw it taut, the lateral pull by the cord when taut causing sufficient friction between the post and its mounting in the base to prevent undesired rotation.

11. A support for tennis nets comprising a cast metal base adapted to be buried in the ground, said base having sides which diverge towards the bottom and are flanged at the bottom, a metal tube partly cast in said base and partly projecting upwardly therefrom, a post mounted to rotate freely in said metal tube, means for rotating the post, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction between the post and its mounting in the base to prevent undesired rotation.

12. A support for tennis nets comprising a cast metal base adapted to be buried in the ground, said base having sides which diverge towards the bottom and are flanged at the bottom, a metal tube partly cast in said base and partly projecting upwardly therefrom, a post mounted to rotate freely in said metal tube, said post being formed by a metal tube, a removable knob at the upper end of the post, a tommy bar within the upper end of the post, said knob being connected to the tommy bar and forming a handle thereon, at least one hole in the side of the post for receiving the end of the tommy bar when withdrawn from the post, and means for securing the end of a cord to the post whereby rotation of the post will wind the cord thereon and draw it taut, the lateral pull by the cord when taut causing sufficient friction between the post and its mounting in the base to prevent undesired rotation.

13. A support for tennis nets comprising a cast metal base adapted to be buried in the ground, said base having sides which diverge towards the bottom and are flanged at the bottom, a metal tube partly cast in said base and partly projecting upwardly therefrom, a post mounted to rotate freely in said metal tube, said post being formed by a metal tube, a reinforcing liner within the supported end of said tube, a removable knob at the upper end of the post, a tommy bar within the upper end of the post, said knob being connected to the tommy bar and forming a handle thereon, at least one hole in the side of the post for receiving the end of the tommy bar when withdrawn from the post, means for securing the end of a cord to the post whereby rotation of the post will wind the cord thereon and draw it taut, and flanges on the post forming a narrow groove for accommodating the cord whereby its height on the post will not be altered as it is wound thereon, the lateral pull by the cord when taut causing sufficient friction betwen the post and its mounting in the base to prevent undesired rotation.

In witness whereof I affix my signature.

HERBERT LEE WRIGHT.